United States Patent
Karve et al.

(10) Patent No.: US 11,194,575 B2
(45) Date of Patent: Dec. 7, 2021

(54) INSTRUCTION ADDRESS BASED DATA PREDICTION AND PREFETCHING

(71) Applicant: International Business Machines Corporation, Armonk, NY (US)

(72) Inventors: Mohit Karve, Austin, TX (US); Naga P. Gorti, Austin, TX (US); Edmund Joseph Gieske, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 16/676,754

(22) Filed: Nov. 7, 2019

(65) Prior Publication Data

US 2021/0141642 A1 May 13, 2021

(51) Int. Cl.
*G06F 9/30* (2018.01)

(52) U.S. Cl.
CPC ...... *G06F 9/30043* (2013.01); *G06F 9/30047* (2013.01)

(58) Field of Classification Search
CPC .......................... G06F 9/30043; G06F 9/30047
See application file for complete search history.

(56) References Cited

U.S. PATENT DOCUMENTS

| | | | |
|---|---|---|---|
| 4,477,872 A * | 10/1984 | Losq ..................... | G06F 9/3844 712/240 |
| 6,438,673 B1 | 8/2002 | Jourdan et al. | |
| 6,507,895 B1 | 1/2003 | Wang et al. | |
| 6,907,520 B2 | 6/2005 | Parady | |
| 7,657,729 B2 * | 2/2010 | El-Essawy ............. | G06F 9/383 712/240 |
| 8,397,049 B2 * | 3/2013 | Wang .................. | G06F 12/1027 711/207 |
| 9,189,233 B2 * | 11/2015 | Sasanka ................ | G06F 9/3861 |
| 9,672,019 B2 * | 6/2017 | Sager .................. | G06F 11/3648 |
| 9,875,106 B2 * | 1/2018 | Godard ................ | G06F 9/3804 |
| 9,971,695 B2 * | 5/2018 | Watahiki ............. | G06F 12/0862 |
| 2006/0059311 A1 * | 3/2006 | Van De Waerdt .. | G06F 12/0862 711/137 |
| 2014/0189249 A1 * | 7/2014 | Ye ....................... | G06F 12/0862 711/137 |
| 2017/0286119 A1 * | 10/2017 | Al Sheikh ............. | G06F 9/3832 |
| 2019/0138451 A1 * | 5/2019 | Alam .................. | G06F 12/0862 |
| 2020/0081714 A1 * | 3/2020 | Britto .................. | G06F 12/0857 |

(Continued)

OTHER PUBLICATIONS

Ahuja, et al., "Performance Potential of Effective Address Prediction of Load Instructions," 12 pgs., Jan. 2001.

(Continued)

*Primary Examiner* — Cheng Yuan Tseng
(74) *Attorney, Agent, or Firm* — Kelli D. Morin

(57) ABSTRACT

Provided is a method, computer program product, and system for performing data address prediction. The method comprises receiving a first instruction for execution by a processor. A load address predictor (LAP) accesses a LAP table entry for a section of an instruction cache. The section is associated with a plurality of instructions that includes the first instruction. The LAP predicts a set of data addresses that will be loaded using the LAP table entry. The method further comprises sending a recommendation to prefetch the set of data addresses to a load-store unit (LSU).

18 Claims, 6 Drawing Sheets

(56) References Cited

U.S. PATENT DOCUMENTS

2020/0387381 A1* 12/2020 Karve ................ G06F 12/0862

OTHER PUBLICATIONS

Anonymous, "Exploiting Agnostic Branches," an IP.com Prior Art Technical Database, IP.com No. IPCOM000244897D, Jan. 27, 2016, 3 pgs.

Anonymous, "Mechanism to Decrease Cold Cache Startup Effects in Instruction Cache Prefetching," an IP.com Prior Art Technical Database, IP.com No. IPCOM000248538D, Dec. 14, 2016, 7 pgs.

Sair et al., "A Decoupled Predictor-Directed Stream Prefetching Architecture," 32 pgs., 2015.

Wong, W., "Targeted Data Prefetching," Department of Computer Science, and Singapore-MIT Alliance, National University of Singapore, 11 pgs., 2015.

Yoaz, et al., "Speculation Techniques for Improving Load Related Instruction Scheduling," 12 pgs., 2010.

\* cited by examiner

FIG. 4A

| 402 | 404 | 406 | 408 | 410 |
|---|---|---|---|---|
| 1 | 2 | 32 | 8 | 8 |
| V | TID | Upper D 32 | Iter Seen | Iter Reported |
| Valid | Thread ID | Upper 32 bits of Data Address | # of times this section has been seen at ifetch | # of times this section has been reported at completion |
| | | A | Is | Ir |
| 1 | 01 | 1111001...01001010 | 100 | 90 |

| 452 | 454 | 456 | 458 | 460 | 462 | |
|---|---|---|---|---|---|---|
| 1 | 25 | 8 | 5 | 5 | 3 | |
| V | Lower D 25 | Stride | One Pass | This Pass | Match | Confidence of matches |
| Valid | Lower 25 bits of Data Address | Observed stride from last line change | # of iterations of one icache section before moving to next line in dcache | # of iterations seen in this pass | | |
| | A | S | P | Pt | M | |
| 1 | 10100100...10111010 | 1 | 7 | 2 | 4 | |
| 1 | 1011110...00101011 | 1 | 7 | 3 | 5 | |

450 — 451A / 451B
470, 472, 474, 476, 478, 480

| Iteration | Actual Daddr | Iter Seen | Iter Report | Table Daddr | One Pass | This Pass | Stride | Remainder | Predicted Daddr |
|---|---|---|---|---|---|---|---|---|---|
| 100 | 201 | 100 | 90 | 200 | 7 | 2 | 1 | 5 | N/A |
| 101 | 201 | 101 | 90 | 200 | 7 | 2 | 1 | 6 | N/A |
| 102 | 202 | 102 | 91 | 200 | 7 | 3 | 1 | 0 | 202 |
| 103 | 202 | 103 | 91 | 200 | 7 | 3 | 1 | 1 | N/A |
| 104 | 202 | 104 | 92 | 200 | 7 | 4 | 1 | 2 | N/A |
| 105 | 202 | 105 | 93 | 200 | 7 | 5 | 1 | 3 | N/A |
| 106 | 202 | 106 | 93 | 200 | 7 | 5 | 1 | 4 | N/A |
| 107 | 202 | 107 | 94 | 200 | 7 | 6 | 1 | 5 | N/A |
| 108 | 202 | 108 | 95 | 201 | 7 | 7 | 1 | 6 | N/A |
| 109 | 203 | 109 | 96 | 201 | 7 | 1 | 1 | 0 | 203 |
| 110 | 203 | 110 | 97 | 201 | 7 | 2 | 1 | 1 | N/A |
| 111 | 203 | 111 | 98 | 201 | 7 | 3 | 1 | 2 | N/A |
| 112 | 203 | 112 | 99 | 202 | 7 | 4 | 1 | 3 | N/A |
| 113 | 203 | 113 | 103 | 202 | 7 | 1 | 1 | 4 | N/A |
| 114 | 203 | 114 | 103 | 202 | 7 | 1 | 1 | 5 | N/A |
| 115 | 203 | 115 | 104 | 202 | 7 | 2 | 1 | 6 | N/A |
| 116 | 204 | 116 | 105 | 202 | 7 | 3 | 1 | 0 | 204 |

FIG. 5

INSTRUCTION ADDRESS BASED DATA PREDICTION AND PREFETCHING

BACKGROUND

The present disclosure relates generally to the field of computer systems, and more particularly to an instruction address based data prefetcher.

In many modern computing systems one or more processors working together can run multiple applications (e.g., programs) simultaneously. To execute a program, the operating system, in simple terms, receives system calls from an application, then directs the processor to fetch the data to be processed, processes the data per the instructions (e.g., code), then writes the processed data to a storage location. Many versions of modern architecture use levels of memory to increase the efficiency of the overall system. There is a long-term storage, usually larger capacity but relatively slow, and short-term storage (e.g., random access memory RAM, cache, etc.) that are much faster but can have a relatively small capacity.

SUMMARY

Embodiments of the present disclosure include a method, computer program product, and system for performing data address prediction. The method comprises receiving a first instruction for execution by a processor. A load address predictor (LAP) accesses a LAP table entry for a section of an instruction cache. The section is associated with a plurality of instructions that includes the first instruction. The LAP predicts a set of data addresses that will be loaded using the LAP table entry. The method further comprises sending a recommendation to prefetch the set of data addresses to a load-store unit (LSU).

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIGS. 4A and 4B illustrate an example load address predictor table entry for a section of an instruction address space that includes two data streams, in accordance with embodiments of the present disclosure.

FIG. 5 illustrates a table showing a load address predictor predicting data addresses to be prefetched during execution of an example data stream, in accordance with embodiments of the present disclosure.

Figure 1:
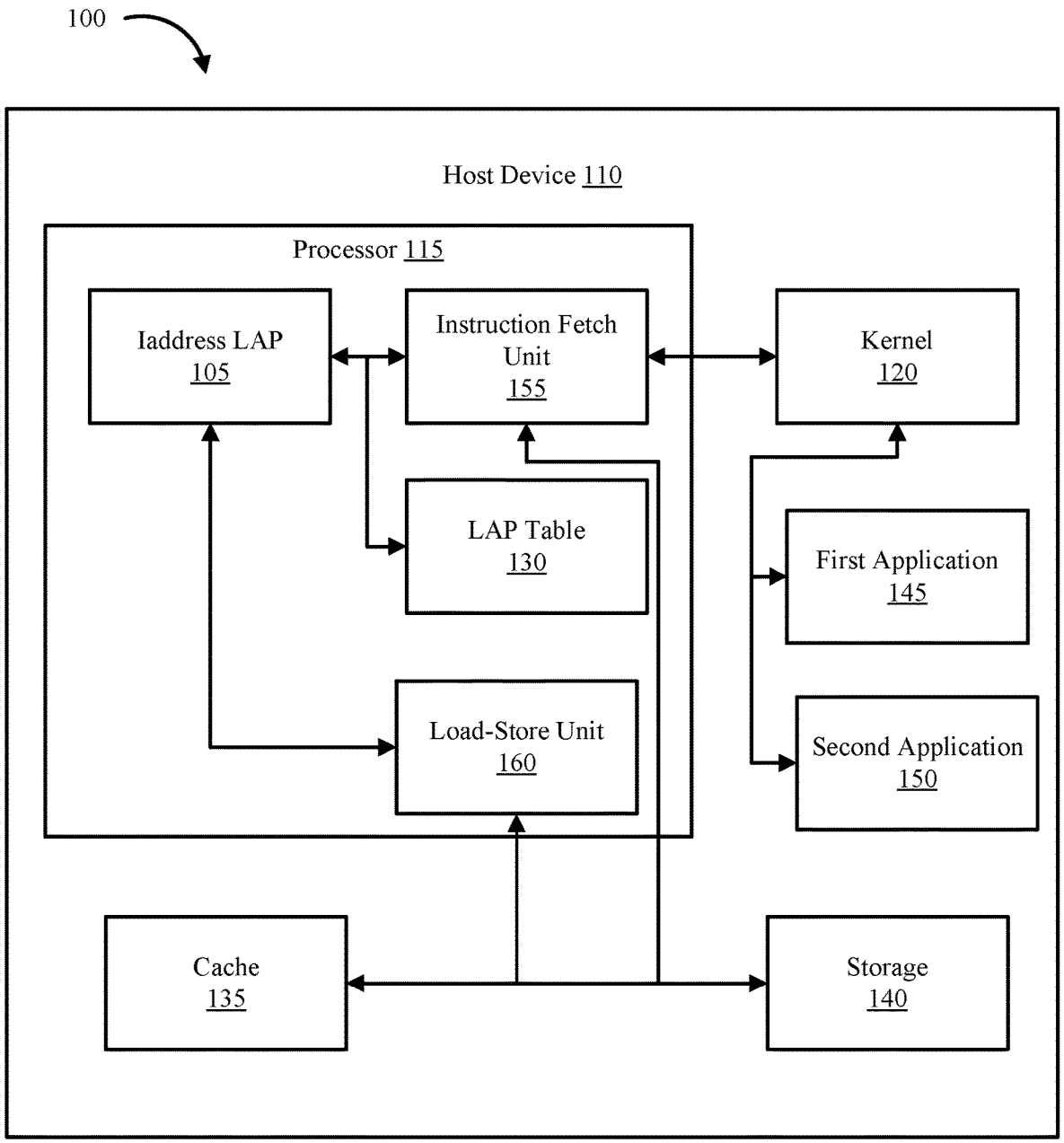
FIG. 1 illustrates a functional diagram of an example computing environment suitable for operation of a load address predictor, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer systems, and in particular to an instruction address based data prefetcher. While the present disclosure is not necessarily limited to such applications, various aspects of the disclosure may be appreciated through a discussion of various examples using this context.

Embodiments of the present disclosure recognize prefetching data can increase the overall efficiency of the computing system. Data prefetching is a process by which the computing system attempts to predict future data that will be executed based on current instructions, current data, historical usage, and other similar factors, and then reading the future data into the cache in anticipation of a request to do so. Prefetching can be resource intensive, and, if not done effectively, can have a detrimental effect on the efficiency of the computing system. In some embodiments, prefetchers use a confidence score to maintain the efficiency of prefetch systems. The confidence score can indicate the confidence an associated data address will be called for in response to the current instructions.

Data prefetchers fall broadly into two categories: data address based prefetchers and instruction address based prefetchers. Data address based prefetchers have the advantage of being more tolerant to different instruction addresses prefetching the same data stream (as in the case of loop unrolling), but they must wait until address generation is complete for loads before any prefetches can be sent out. Furthermore, unless additional features are added, data address based prefetchers see loads out of program order, which makes it harder to identify patterns.

Instruction address-based prefetchers are used to prefetch data memory by identifying access patterns by one or more applications. Unlike data address based prefetchers, instruction address prefetchers wait only for the decode stage of the pipeline and make predictions whenever the same load is seen. This single load-based approach has the advantage of making predictions early, but as recognized by the inventors, suffers from duplication of entries for the same stream in cases like loop unrolling.

Embodiments of the present disclosure include an instruction address (iaddress) based load address predictor (LAP) (also referred to herein as "iaddress LAP" or simply the "LAP") that can be accessed at instruction fetch time. The LAP may be embodied using hardware, firmware, software, and/or a combination thereof. The LAP may be used to augment L3 prefetching by tracking access patterns of iaddresses. Because the disclosed LAP can predict a data address at instruction fetch time, prefetching can be performed earlier in the pipeline than with conventional iaddress-based prefetchers. Additionally, some embodiments of the LAP are tolerant to loop unrolling, enable better performance for stride-N streams, and/or reduce pollution at load-store unit (LSU) prefetch caused by non-streaming loads.

As processor streams are executed, instruction address entries are created and stored in an instruction address history table (history table) in the Load Address Predictor. The history table is also referred to herein as a LAP table. Each entry may include: an instruction address, one or more potential associated data address(es), a confidence score, and/or various other data. Prefetch systems are more effective when the history table is filled with entries having either a high confidence score or a low confidence score. The closer to the boundaries (e.g., high or low) the more effective the prefetch system. An entry with a high confidence score causes prefetching to occur and saves time and computing resources. An entry with a low confidence score prevents prefetching from occurring, thereby preventing polluting the cache with excess unneeded data.

In some embodiments, the iaddress-based LAP is accessed using a "section" of the instruction address space. As used herein, a "section" includes a portion of the instruction address space that contains more than one instruction. For the purpose of illustration, examples disclosed herein include a section having a size of 64 Bytes and containing sixteen 32-bit instructions. However, it is to be understood that this is for illustrative purposes only, and that the section may be any size. For example, a section may be smaller than one cache line, or it may consist of many cache lines. In some particular examples, a section may include anywhere from 8-32 instructions.

In some embodiments, the LAP table is indexed by a subset of the instruction fetch address register (IFAR) addresses (e.g., a section of the instruction cache (icache)). The LAP may maintain information such as the address, line stride, time spent on a single data cache (dcache) line, and a confidence field in the LAP table. Some or all of this information may be used to predict the addresses of all loads in an icache section at fetch time, allowing the instruction fetch unit (IFU) to send at least the address of the loads that were just fetched by the IFU, allowing the LSU to prefetch that address into the first level cache without waiting for the load to complete address generation, and potentially prefetching further ahead to cover more latency. Once all instructions in a section have completed, the table is updated. Accordingly, a single update handles all data loads for a section.

In some embodiments, at the time that the IFU makes a request for a new icache line, the address will also be run through the iaddress LAP, which tracks the behavior of multiple loads per section of the icache. The section address is looked up in the LAP table and, in case of a hit, the LAP will provide a set of address predictions for multiple loads in that section to the LSU. The LSU can then begin prefetching data from the predicted address(es). In the case of a miss, the section will allocate a new LAP entry in the LAP table.

When a load completes, information about its address is stored in a buffer that collects information for multiple accesses to the same data address line in a single instance of an icache section. Once all instructions in that section have completed (e.g., retired), the buffer updates the LAP (e.g., the LAP table). In this manner, the LAP is read from, and written to, purely in program order, eliminating any confusion arising due to out of order execution of loads.

In some embodiments, the LAP is able to determine the address of data to be fetched even before the instruction is decoded using a subset of the instruction address to index into the LAP table. This allows the LAP to make predictions 2-3 cycles earlier than contemporary designs, which is a significant fraction of L2 latency (often approximately 10-15 cycles) and L3 latency (often approximately 25-35 cycles). For example, for systems having an L2 and L3 latency of 12 and 26 cycles, respectively, this results in predictions 25% and 11.5% earlier in the latency that with other designs. It also allows the LAP to track multiple loads in that subset, which means that the LAP can capture unrolled loop behavior in a single entry (because most of the unrolled loop's instructions will be a part of the same instruction address region). Existing designs will have multiple entries for these loops and waste computing resources.

By maintaining a history of the number of times an instruction is seen before the LSU moves to the next cache line, in some embodiments, the LAP is able to prefetch different data streams at different rates, which allows for "just-in-time" prefetches. In other words, tracking the number of loads that access a cache line allows the LAP to perform fine grained just-in-time prefetching for different rates of line consumption. For example, consider code that is working on a vector dataset and a scalar dataset. The vector set consumes cache lines much faster than the scalar set. Contemporary prefetchers will prefetch these sets at the same rate, resulting in either under-prefetch of the vector set, or over-prefetch of the scalar set. Embodiments of the LAP disclosed herein, however, can identify the individual rate of line consumption and prefetch each set correctly.

Embodiments of the present disclosure include a computer system having a processor that executes a plurality of load instructions out of order, accessing the LAP that is allocated and accessed in program order, when an instruction fetch unit requests a new cache line. The LAP provides a set of address predictions for loads in a section of instructions, thereby allowing the Load-Store Unit to prefetch memory addresses into the data cache without waiting for the address-generation part of the load instruction to execute.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 illustrates an example computing environment 100 that is capable of running an iaddress LAP 105, in accordance with embodiments of the present disclosure. The computing environment 100 shown in FIG. 1 is provided as an illustrative example, and should not be construed as limiting. Many modifications of the depicted environment may be made by those skilled in the art without departing from the scope of the disclosure.

Computing environment 100 includes host device 110. Host device 110 can be a standalone computing device, a management server, a web server, a mobile computing device, or any other electronic device or computing system capable of receiving, sending, and processing data. In some embodiments, host device 110 can represent a server computing system utilizing multiple computers as a server system, such as in a cloud computing environment. In some embodiments, host device 110 represents a computing system utilizing clustered computers and components (e.g., database server computers, application server computers, etc.) that act as a single pool of seamless resources when accessed within computing environment 100. In some embodiments, host device 110 includes iaddress LAP 105, processor 115, kernel 120, LAP table 130, cache 135, storage 140, first application 145, and second application 150.

Processor 115 can be any combination of hardware and/or software configured to execute program instructions provided by an application (e.g., first application 145, second application 150, etc.). In some embodiments, processor 115 is comprised of two or more processors (or cores) working in unison. In some embodiments, processor 115 can perform operations including reading data from memory (e.g., storage 140), writing data to memory (e.g., cache 135, storage 140), processing data, fetching data, prefetching data, etc. Processor 115 can be communicatively coupled to other components within host device 110. In some embodiments, processor 115 can exchange data with kernel 120, cache 135, and storage 140. In some embodiments, processor 115 includes iaddress LAP 105, LAP table 130, instruction fetch unit 155 (IFU), and load-store unit 160 (LSU)

In some embodiments, a three-bit confidence score is used (e.g., 0 to 7). However, other methods and sizes of confidence scores can be used. A high confidence score may indicate that the associated data address that will be used is known, and/or the there is a consistent pattern of usage related to the specific instruction address. For example, first application 145 may process line-eleven immediately after processing line-ten without exception. The entry in LAP table 130 for data address of line-ten would therefore include a high confidence with line-eleven as the associated data address. A low confidence may indicate random association between data address (e.g., pointer-chasing access pattern). A moderate confidence score (e.g., 3 out of 7) may indicate an associated data address is predictable about half of the time.

The instruction address may include which area of storage (e.g., storage 140) an instruction is located. The confidence score may represent the likelihood that an associated data address will be processed as a result of the current instruction address.

Figure 3:
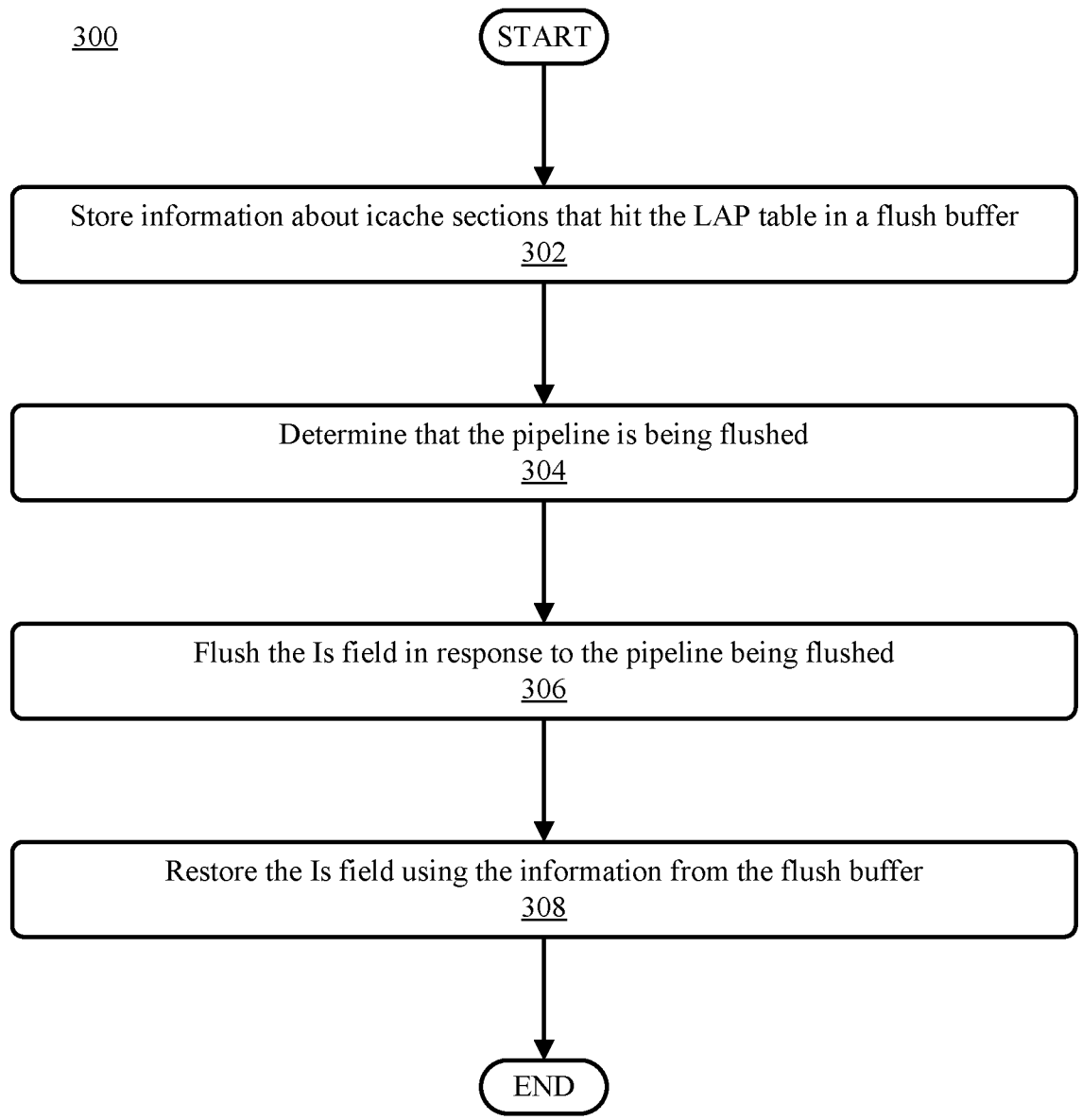
FIG. 3 illustrates a flowchart of an example method for flushing a load address predictor table to correct unreliable data, in accordance with embodiments of the present disclosure.

LAP table 130 can be any combination of hardware and/or software configured to store information relating to information flow through one or more processors. In some embodiments, LAP table 130 stores the information as one or more entries. Each entry in the LAP table 130 may include, without limitation, an instruction address, one or more associated data address(es), and a confidence score. In some embodiments, LAP table 130 is included in iaddress LAP 105. In some embodiments, LAP table 130 includes information about sections of iaddresses and information about the individual addresses within the sections. The LAP table 130 may be used to predict which data should be prefetched based on a particular iaddress and the section(s) of iaddresses that the particular iaddress belongs to. An example entry in the LAP table 130 is shown in FIG. 3.

In some embodiments, entries in LAP table 130 are removed. They can be removed by being displaced by new more relevant entries. They can be removed after certain conditions are met. The conditions can be number of cycles, number of hits, or other similar parameters.

Instruction fetch unit 155 can be any combination of hardware and/or software configured to fetch data for a stream. The stream can be a software instruction stream. In some embodiments, the one or more streams are initiated by first application 145 (or second application 150) via kernel 120.

Load-store unit 160 can be any combination of hardware and/or software configured to execute data memory access commands (including prefetch commands). In some embodiments, load store unit 160 is directed by iaddress LAP 105. In some embodiments, load store unit 160 brings in data from memory and is directed by iaddress LAP 105 to prefetch or not prefetch associated data.

Kernel 120 can be any combination of hardware and software capable of managing the workload of host device 110 and provide access to low-level operating components of the host device 110. In some embodiments, kernel 120 receives system calls from one or more applications (e.g., first application 145, second application 150, etc.) requesting resources of host device 110. In these embodiments, kernel 120 prioritizes and executes the system calls based on one or more algorithms. In some embodiments, kernel 120 is part of the operating system of host device 110. Kernel 120 can be communicatively coupled to the other components of host device 110. In some embodiments, kernel 120 includes iaddress LAP 105, however FIG. 1 shows iaddress LAP 105 as a separate component.

In some embodiments, kernel 120 includes a queue of instructions that are in line to be carried out by a processor 115. In some embodiments, the instructions are load and store instructions (e.g., read, write, etc.). In some embodiments, the LSU 160 includes iaddress LAP 105. The LSU 160 may look at the data in LAP table 130 and assist in determining if other data will be prefetched.

Cache 135 (e.g., a file cache) can be any combination of hardware and/or software that stores data to be processed. In some embodiments, cache 135 is smaller (e.g., stores less data) and faster than other storage (e.g., storage 140) in host device 110. In some embodiments, cache 135 includes two or more separate cache systems that work in unison under the direction of kernel 120. In some embodiments, cache 135 can wholly or partially include random access memory (RAM) of host device 110. In some embodiments, cache 135 may be comprised of a read cache and a write cache. In some embodiments, the cache 135 may be comprised of an instruction cache (e.g., a cache that stores instructions for execution) and a data cache (e.g., a cache that stores data to be processed).

The cache 135 may have multiple levels (e.g., L1, L2, and L3). The L1 cache may be the smallest, but fastest cache level. Meanwhile, the L2 cache may be larger than L1 cache, but slower. Similarly, the L3 cache may be larger and slower than the L2 cache, and so on for each level of cache. In some embodiments, such as those with multiple processor or processor cores, there may be one or more sets of cache associated with one or more processors/cores. For example, a system having two processors may similarly contain two L1 caches. In some embodiments, two or more processors or processor cores may share a set of caches. For example, a system having four processor cores may have two L1 caches, and each L1 cache may be shared by two of the processor cores. All four processor cores may share a single L2 cache, or there may be multiple L2 caches shared by a subset of the processor cores. Cache 135 may be communicatively coupled to other components within host device 110.

Because a cache is relatively small in size, the data in the cache is frequently turned over. In various embodiments, data is kept in cache 135 according to one or more algorithms. For example, one algorithm can be least recently used (LRU). In an LRU cache, the data that has not been used for the longest period of time is flushed from the cache when new data needs to be written to the cache. In some embodiments, the algorithms that can manage a cache include, but are not limited to, pseudo least recently used (PLRU), first in first out (FIFO), last in first out (LIFO), etc.

Storage 140 can be any combination of hardware and/or software configured to store data. In some embodiments, storage 140 stores the programs and instructions to operate and manage iaddress LAP 105, host device 110, kernel 120, first application 145, second application 150, and/or any other programs or modules configured to operate in host device 110. Storage 140 may be communicatively coupled to other components within host device 110.

In various embodiments, storage 140 includes one or more of cloud storage (public or private), tape drives, HDD, SAS drives, SSD, and any other storage medium known in the art. In some embodiments, storage 140 has a larger capacity than cache 135.

First application 145 and/or second application 150 can be any combination of hardware and/or software configured to carry out a function on a computing device (e.g., host device 110). In some embodiments, first application 145 and/or second application 150 are software programs (e.g., accounting software, system backup software, word processor, etc.). In some embodiments, first application 145 and/or second application 150 are web applications. In some embodiments, first application 145 and/or second application 150 are a set of instructions configured to perform one or more tasks. In some embodiments, first application 145 and/or second application 150 send system calls to kernel 120 and/or processor 115 and receive the processed results from kernel 120 and/or processor 115. The system call may include a data set. The data set can include the line(s) of code (instructions) to process, the location the code is stored at (instruction address), where/if to write the results, etc.

Figure 2:
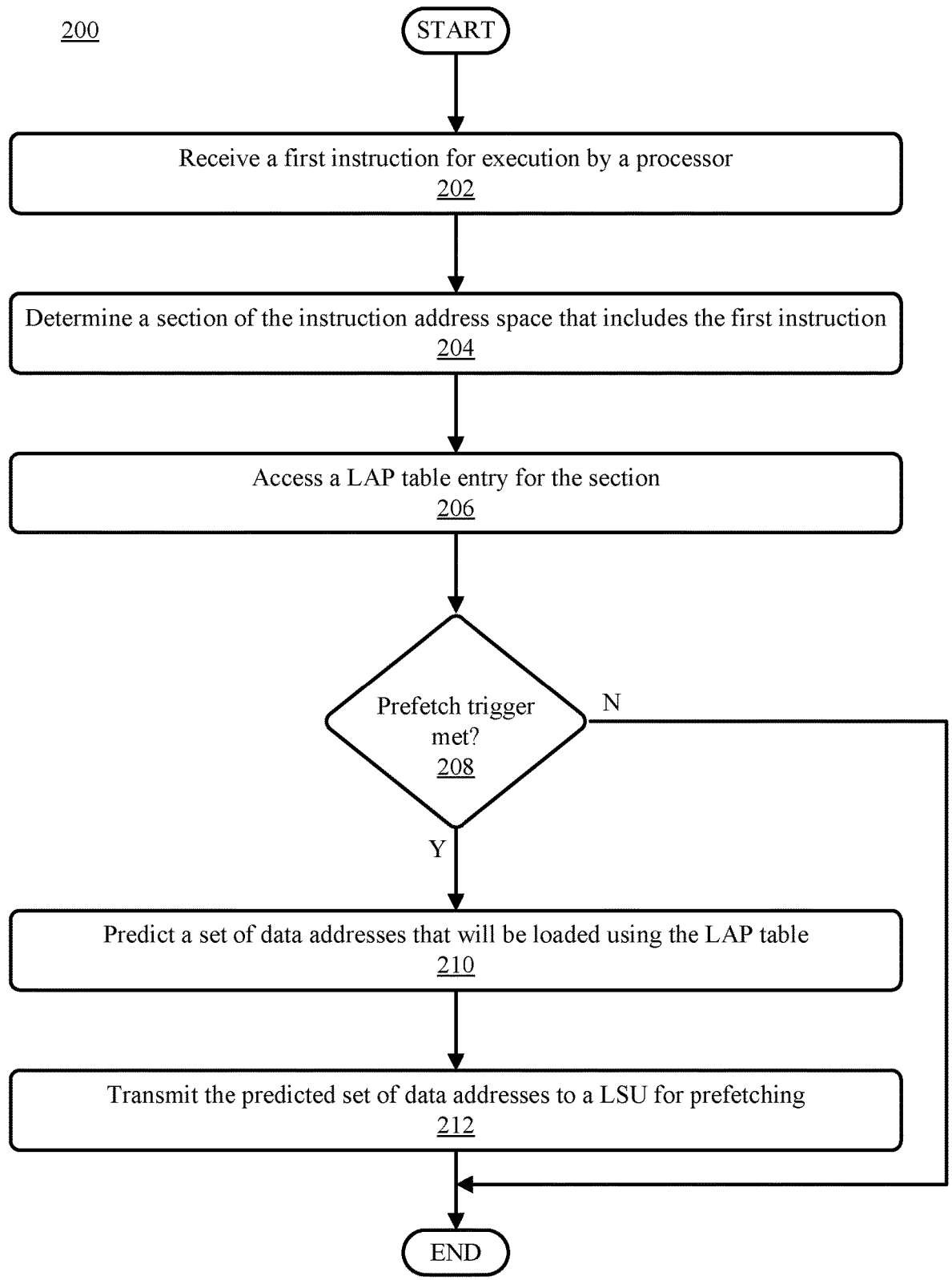
FIG. 2 illustrates a flowchart of an example method for predicting a set of data addresses to be prefetched using a load address predictor, in accordance with embodiments of the present disclosure.

Referring now to FIG. 2, illustrated is a flowchart of an example method 200 for predicting data addresses to be prefetched using an iaddress LAP, in accordance with embodiments of the present disclosure. The method 200 may be performed by hardware, firmware, software executing on a processor, or any combination thereof. For example, in some embodiments, the method 200 is performed by a LAP. The method 200 may begin at operation 202, wherein the LAP receives a first instruction for execution by a processor.

The first instruction may be part of a data stream and includes an associated instruction address. The instruction address identifies a location in an instruction address space, such as in an instruction cache, where the first instruction is located. Using the instruction address (or a portion thereof), the LAP determines a section of the instruction address space that includes the first instruction at operation 204. As described herein, the determined section may have any size and includes a plurality of instructions, including the first instruction.

At operation 206, the LAP accesses a LAP table entry for the section and determines, at decision block 208, whether a prefetch trigger is met. The LAP table entry may be populated through execution of the streams, as discussed in reference to FIGS. 4A and 4B. The prefetch trigger determines when the LAP will make a recommendation to prefetch data from one or more data addresses. An example prefetch trigger is described in Equations (1) and (2) below with respect to FIGS. 4A and 4B.

If, at decision block 208, the LAP determines that the prefetch trigger is not met, the LAP may continue to monitor execution of the data stream until a prefetch trigger is met. Once the prefetch trigger is met (Yes at decision block 208), the LAP predicts a set of data addresses that will be loaded using the LAP table. In some embodiments, the LAP predicts the data addresses of all of the data that will be loaded during execution of the data stream, while in other embodiments the LAP predicts the data addresses for a subset of the data that will be loaded. For example, in some embodiments, the LAP predicts the next data line to be loaded, or the next two data lines to be loaded. The LAP may also determine a confidence value for the set of data addresses (individually, for portions of the set, or for the set as a whole).

At operation 212, the LAP transmits the predicted set of data addresses to the LSU for prefetching. In some embodiments, the LAP also transmits a confidence value to the LSU which informs the LSU of the confidence of the LAP in whether the set of data addresses will be loaded. The LSU may then use the predicted set of data addresses and confidence values to determine whether to prefetch the data at the set of data addresses. After transmitting the predicted set of data addresses to the LSU, the method 200 ends.

Referring now to FIG. 3, illustrated is a flowchart of an example method 300 for flushing a load address predictor table to correct unreliable data, in accordance with embodiments of the present disclosure. The method 300 may be performed by hardware, firmware, software executing on a processor, or any combination thereof. For example, in some embodiments, the method 300 is performed by a LAP. The method 300 may begin at operation 302, wherein the LAP stores information about icache sections that hit the LAP table in a flush buffer.

In order to keep the LAP consistent, a small amount of area (i.e., the flush buffer) may have to be spent for flush handing, which will correct the Is value in the LAP whenever a flush occurs. This is because the distance between the iterations seen and iterations reported is used to predict what the address of the incoming load is, given the address of the last completed load in the stream. If this distance goes out of sync, results would be incoherent. Accordingly, in some embodiments, the LAP table may be flushed periodically or in response to certain events (e.g., is response to a pipeline flush). This feature allows the LAP to maintain a higher degree of accuracy of predictions, where other predictors might be corrupted by wrong path instructions.

The flush buffer may be a set of registers configured to store data used for flush handling of the LAP table. For example, the flush buffer may be a circular FIFO. The information stored in the flush buffer may include an identifier of the section, an index where the LAP table was hit by the section, and the Iter Seen (Is) value before the update. As described herein, the Is value for a section is the number of times the section has been seen at instruction fetch. Each entry in the flush buffer may further include an instruction tag (ITAG).

At operation 304, the LAP may determine that the LAP table needs to be flushed. For example, the LAP may determine that the data in the LAP table is unreliable for predictions. The LAP table may need to be flushed as a result of a pipeline flush (e.g., due to a branch mispredict, store hit load, and/or thread imbalance). Branch mispredictions (or other flushes) may cause the processor to fetch the same instructions multiple times, even though they retire only once. This inconsistency will break the equation as it is no longer possible to tell how far behind retirement the instruction fetch stage is. This may result in the iterations seen and iterations reported fields, which are used to predict the address of the next load, becoming out of sync (e.g., the distances between the fields is incorrect). If the fields are out of sync, the accuracy of predictions may decrease and/or the predictions may become incoherent.

At operation 306, the LAP table is flushed. In some embodiments, the Is field may be flushed, while other fields may be kept. At operation 308, the LAP table may be restored using the information in the flush buffer. For example, the Is field information from directly before the pipeline flush may be restored from the flush buffer (e.g., using the ITAG to make sure it only restores flushed loads). By flushing the Is fields and replacing the data with the data from the flush buffer, the LAP may realign the data in the LAP table, specifically as between the iterations seen and the iterations reported fields. After restoring the LAP table using the information from the flush buffer, the method 300 may end.

Referring now to FIG. 4A, illustrated is a section portion 400 of an example LAP table entry for a section, in accordance with embodiments of the present disclosure. The section portion 400 illustrates the type of information for a section that may be collected and stored in an example LAP table entry. The LAP table is generated and populated through execution of the streams. If a processor stream misses the LAP table, the LAP picks an entry for replacement. In some embodiments, the LAP table may be direct mapped, in which case there is only one candidate. In other embodiments, the LAP table may be set associative, in which case the LAP may use LRU, pLRU, etc. to pick the victim.

Once the victim is selected, an entry is allocated for the new section. The entry is mostly empty upon first allocation, with Is set to 1 and Ir set to 0. The valid bit and thread id are set. As execution proceeds, all loads and stores in that section will retire. As they retire in order, the LAP buffer in the retirement stage of the pipeline collects all data addresses associated with that icache section. If there are contiguous lines, the stride field may also be saved. If there are non-contiguous lines, the buffer will save each address as a distinct table (e.g., an entry as shown in FIG. 4B). Future accesses will hit the table and continue to update the stride, match, iterations, and one pass fields.

The section portion 400 includes a header 401A and section-specific data 401B. The section portion 400 for the LAP table entry includes five fields (represented by the five columns 402-410), with each field corresponding to a different type of information collected for a section. Similarly, the section portion 400 includes five rows 412-420. The first four rows 412-418 store the header 401A information, and the fifth row 420 stores section data 401B for a first section.

Within the header 401A, the first row 412 shows a size of the information stored in each column (in bits). The second row 414 shows a field ID for each field 402-410. The third row 416 provides descriptive information for the type of data stored in each field 402-410, and the fourth row 418 provides a variable name for each field 402-410, as used in the equations disclosed herein.

The first field 402 (labeled "V") stores whether or not the entry is valid. The second field 404 (labeled "TID") includes the thread ID for a section. The third field 406 (labeled "Upper D 32") includes the upper 32 bits (e.g., the 32 highest order bits) of the data address (daddr). The upper 32 bits of the daddr are represented by the variable "A" in the equations disclosed herein. The fourth field 408 (labeled "Iter Seen") includes data pertaining to the number of times a section has been seen at ifetch. The Iter Seen field is represented by the variable "Is" in the equations disclosed herein. The fifth field 410 (labeled "Iter Reported") includes data pertaining to the number of times a section has been reported at competition (retirement). The Iter Reported field is represented by the variable "Ir" in the equations disclosed herein.

Referring now to FIG. 4B, illustrated is an instruction portion 450 of an example LAP table entry for a section, in accordance with embodiments of the present disclosure. Each section may include N instruction portions 450, one for each data address stream. The instruction portion 450 illustrates the type of information for a data stream that may be collected and stored in an example LAP table entry.

The instruction portion 450 includes a header 451A and data stream-specific data 451B. The instruction portion 450 for the LAP table entry includes six fields (represented by the six columns 452-462), with each field corresponding to a different type of information collected for a data stream. Similarly, the instruction portion 450 includes six rows 470-480. The first four rows 470-476 store the header 451A information, and the remaining rows 478, 480 store data stream data 401B for two data streams.

Within the header 451A, the first row 470 shows a size of the information stored in each column (in bits). The second row 472 shows a field ID for each field 452-462. The third row 474 provides descriptive information for the type of data stored in each field 452-462, and the fourth row 476 provides a variable for each field 452-462, as used in the equations disclosed herein.

The first field 452 (labeled "V") stores whether that entry is valid. The second field 454 (labeled "Lower D 25") includes the lower 25 bits (e.g., the 25 lowest order bits not representing the line offset) of the data address (daddr). For a 64-bit implementation, the lower 25 bits may not be the 25 lowest order bits. This is because the lowest 7 bit may be used as a line offset. The lower 25 bits of the daddr are represented by the variable "A" in the equations disclosed herein. The third field 456 (labeled "Stride") includes data identifying the observed stride from the last line change. In other words, the value of the Stride field indicates the size of the jump between cache lines when getting the new data. Generally, the Stride value will be 1. However, in some embodiments, a fraction of a line may be used for better granularity and/or for irregular strides. The Stride field is represented by the variable S in the equations disclosed herein. The fourth field 458 (labeled "One Pass") includes data pertaining to the number of iterations observed of one icache section before moving on to the next line in the dcache. The One Pass field is represented by the variable "P" in the equations disclosed herein. The fifth field 460 (labeled "This Pass") includes data pertaining to the number of iterations seen in a current pass. The This Pass field is represented by the variable "Pt" in the equations disclosed herein. The sixth field 462 (labeled "Match") contains a confidence score of a match, and is represented in the disclosed equations by the variable M.

In some embodiments, the LAP table is accessed by the section address in the icache and tracks the thread id, upper 32 bits of the load address, number of times the IFU has seen this section, and also the number of times that section has completed. It also contains N data stream entries that track the lower bits of the data addresses for each stream that is accessed by that section, the stride, number of times the icache section is seen before moving on to the next line in the stream, number of times that the section has been seen in the current pass of the line, and a confidence field.

All fields except the Iter Seen field are updated at completion/retirement time. Updating at retirement means that the information is not corrupted by flushes and out of order execution. Updates can be strictly made in program order, just as completion itself must be performed in order. Using N daddr entries allows the LAP to track more than one load stream in each icache section. Additionally, using a single update (at completion time) allows the LAP to coalesce multiple loads to the same line into one daddr entry above (e.g., in the case of an unrolled loop).

As discussed herein, using the LAP table entry shown in FIGS. 4A and 4B, the LAP can predict the next daddr to be prefetched based on the current daddr. The next daddr (Next line) to fetch can be predicted by first calculating an offset (O) using Equation (1), and then adding the offset to the current daddr using Equation (2).

The prefetch trigger can be calculated using Equation (1):

$$O=\{[Is-(Ir-Pt)]/P\}*S \qquad \text{Equation (1)}$$

When the remainder of the divide portion of Equation (1) is 0, the next data address to prefetch is determined, and the next line is prefetched. In other words, when the remainder R of $\{[Is-(Ir-Pt)]/P\}=0$, the next data address is predicted and prefetched.

The next data address (Next line) to fetch can be predicted by first calculating the offset (O) using Equation (1), and then adding the offset to the current daddr using Equation (2):

$$\text{Next line}=A+O \qquad \text{Equation (2)}$$

Additionally, some embodiments utilize a constant C, which is added to the offset O. This allows control over how many lines ahead to prefetch. The constant C may be based on latency of the specific processor architecture. For example, if a processor has a latency of approximately 20 cycles, the constant C may cause prefetching to occur 30 cycles ahead of when the instruction is expected to be executed so that the data is cached when the instruction is next to be executed. Regardless of whether a constant is used, the LAP can know the address of current load at ifetch, without performing address generation (AGEN).

In some embodiments, the LAP table may include an additional field to map instructions to predictions. This may be particularly useful when simulations find that one icache section often contains very different streams.

The match field acts as a confidence of prediction. In some embodiments, the match field is set to an arbitrary, middle number (e.g., when eight numbers are used, ranging from 0-7, it may be set at 3). The match field is incremented whenever the line address changes and the LAP sees the same stride and same number of iterations to move to the next line. It is decremented when either the stride or the iterations don't match what's in the table. In some embodiments, a decay may be used to reduce the match value over time.

The LAP, which only prefetches to the first level cache in some embodiments, can be used to augment a data address based prefetcher for the last level cache in the LSU. This can take the form of hints about installing streams at high confidence (when match field is high), not installing a stream at all (when match field is low), and also the stride of a given data stream (replacing any other stride detection mechanism and saving area).

The match field may be used to provide a recommendation to the LSU Prefetcher of how confident the prediction is. For example, if the match value for a daddr is 5-6 (out of 7) on a hit, the load may be marked as very confident. This tells the LSU prefetcher to install this load in the prefetch request queue (PRQ) as an aggressive stream regardless of phase/UC mode (if missed PRQ). If the match value is very high (e.g., 7 out of 7), the matching PRQ entry may be marked as "sticky." This indicates to the LSU prefetcher that the LAP is extremely confident in the match, and that the LSU prefetcher should not disagree with the LAP recommendation, even if there is contention or out of order instructions. If the match value is 0, mark load as pointer chasing, telling the LSU prefetcher not to install this load in PRQ at all. The LAP may provide stride information to the LSU prefetcher (remove current Stride-N logic). In some embodiments, the LSU prefetcher may be configured to accept the LAP recommendation and prefetch the data address(es) in response to the match value exceeding a predetermined threshold.

As discussed herein, the LAP table may be stored in hardware (e.g., registers) within a processor. The size of the LAP table varies depending the number of entries. In some embodiments, the LAP table may have a common part (which is 51 bits) and a replicated part (which is 47 bits). If N is four, meaning that there are four data streams in the section, the LAP table entry is 239 bits (~30 Bytes). For a 32 entry LAP table, this comes out to approximately 960 Bytes. In some embodiments, the table will need to be dual ported (1R 1W). This will allow the table to be read and updated in parallel. For example, a read at ifetch may coincide with a write due to completion in the same cycle, and by dual porting the table, both can be done in parallel. As another example, a miss that needs to allocate a new entry in the LAP in the next cycle, which will coincide with the next read of the LAP, can be better handled by dual porting the table. Additionally, the LAP may include a small number of buffer entries for collecting loads at completion.

Referring now to FIG. 5, illustrated is a table 500 showing an example of the LAP applying Equations (1) and (2) to predict a data address to be prefetched for a data stream, in accordance with embodiments of the present disclosure. As discussed herein, regardless of the cadence of instruction completion, the LAP correctly identifies the address of the current load that is being fetched in a section. The prefetch offset can be added to the predicted address to cover additional latency.

The table 500 includes a plurality of fields, including Iteration number 502, Actual Daddr 504, Table Daddr 506, One Pass 508, This Pass 510, Remainder 512, and Predicted Daddr 514. Fields with the same name may be the same as, or substantially similar to, the corresponding field described with respect to FIGS. 4A and 4B. For example, the One Pass 508 may be identical to One Pass 458. The Actual Daddr is the data address of the instruction that is being fetched. The hardware does not know the Actual Daddr until address generation. The Table Daddr is the data address that is stored in the LAP (i.e., it is the last completed/retired data address). The Remainder field 512 stores the remainder R of the divide portion of Equation (1). The Predicted Daddr field 514 shows the predicted daddr to be prefetched based on the result of Equations (1) and (2). In the illustrated example in FIG. 5, the Offset O is set to 1 line.

Additionally, the table 500 includes a plurality of records corresponding to each iteration of the data stream, including a first record 552 that corresponds to iteration number 100, a second record 554 that corresponds to iteration number 102, a third record 556 that corresponds to iteration number 109, and a fourth record 558 that corresponds to iteration number 116.

As shown in FIG. 5, when the remainder 512 reaches zero, the LAP predicts a new daddr. For example, the remainder reaches zero every seven iterations, resulting in the lap predicting a new daddr to be prefetched at iterations 102, 109, and 116. This is because each iteration calls the same section and the One Pass value is seven, a new daddr is predicted every seven iterations. In other words, the One Pass value indicates how many accesses there are per each daddr, which in this example corresponds to a cache line.

The remainder is in essence counting up to the point where the line transition happens and emits the next prefetch at that time. The address of that next prefetch is calculated using the Table Daddr in the LAP and the variables Is, Ir, P, and Pt, as discussed herein. When the remainder is zero, the actual address stream is moving to the next line (as a property of the equations disclosed herein). Accordingly, the LAP emits the next prefetch when the remainder is 0.

It is to be understood that only the third through eighth columns (i.e., the Iter Seen through Stride columns) may be stored in the LAP. The remaining columns contain illustrative data provided to aid the understanding of the invention (e.g., the Actual Daddr) or the calculated output of the LAP (e.g., the remainder and Predicted Daddr), and they may not actually be stored in the LAP table.

Figure 6:
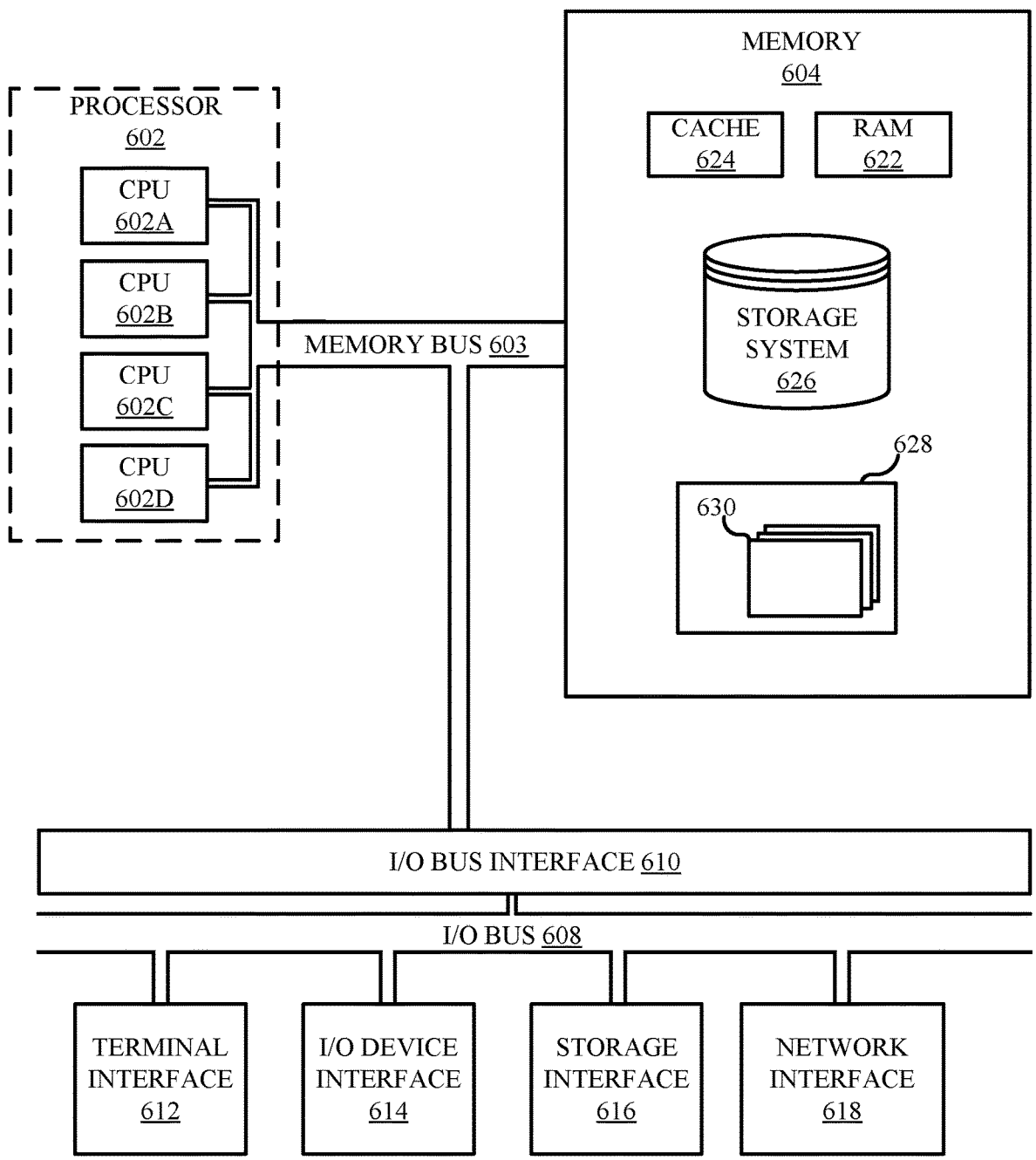
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

What is claimed is:

1. A method comprising:
   receiving a first instruction for execution by a processor;
   accessing, by a load address predictor (LAP), a LAP table entry for a section of an instruction cache, wherein the section of the instruction cache comprises a plurality of instructions that includes the first instruction, the section having an associated section address in the LAP table;
   predicting, by the LAP and using the LAP table entry, a set of data addresses that will be loaded;
   sending, to a load-store unit (LSU), a recommendation to prefetch the set of data addresses;
   storing, using a circular FIFO flush buffer, information for every instruction cache section that hits the LAP table;
   flushing, in response to performing a pipeline flush, the LAP table entry; and
   restoring the values in the LAP table entry using the flush buffer.

2. The method of claim 1, wherein the recommendation sent to the LSU includes a confidence score that indicates a probability that the set of data addresses will be loaded during execution of a program that includes the first instruction.

3. The method of claim 2, wherein the LSU is configured to prefetch the set of data addresses in response to the confidence score exceeding a predetermined threshold.

4. The method of claim 1, the method further comprising:
   updating, by the LAP and at completion, the LAP table entry.

5. The method of claim 4, wherein updating the LAP table entry includes coalescing, by the LAP, multiple loads of an unrolled loop to the same line into a single entry.

6. The method of claim 1, wherein the LAP table entry includes:
   a first value for the number of times the section has been seen at instruction fetch;
   a second value for the number of times the section has been reported at completion;
   a third value for the number of iterations of the section before moving to the next line in a data cache;
   a fourth value of the number of iterations of the section seen in a given pass; and
   a fifth value indicating a confidence level of the recommendation.

7. The method of claim 6, wherein the third value is determined based on historical access patterns for instruction addresses.

8. A system comprising a processor configured to perform a method comprising:
   receiving a first instruction for execution by the processor;
   determining that the first instruction is in a section of an instruction cache, wherein the section comprises a plurality of instructions;
   accessing, in response to determining that the first instruction is in the section, by a load address predictor (LAP), a LAP table entry for the section of the instruction cache;
   predicting, by the LAP and using the LAP table entry, a set of data addresses that will be loaded;
   sending, to a load-store unit (LSU), a recommendation to prefetch the set of data addresses;
   storing, using a circular FIFO flush buffer, information for every instruction cache section that hits the LAP table;
   flushing, in response to performing a pipeline flush, the LAP table entry; and
   restoring the values in the LAP table entry using the flush buffer.

9. The system of claim 8, wherein the recommendation sent to the LSU includes a confidence score that indicates a probability that the set of data addresses will be loaded during execution of a program that includes the first instruction, wherein the set of data addresses includes at least two data addresses, and wherein the LSU is configured to prefetch the set of data addresses in response to the confidence score exceeding a predetermined threshold.

10. The system of claim 8, wherein the method further comprises:
   updating, by the LAP and at completion, the LAP table entry, wherein updating the LAP table entry includes coalescing, by the LAP, multiple loads of an unrolled loop to the same line into a single entry.

11. The system of claim 8, wherein the LAP table entry includes:
   a first value for the number of times the section has been seen at instruction fetch; and
   a second value indicating a confidence level of the recommendation.

12. A computer program product comprising a computer readable storage medium having program instructions embodied therewith, the program instructions executable by processor to cause the processor to perform a method comprising:
   receiving a first instruction for execution by the processor;
   determining that the first instruction is in a section of an instruction cache, wherein the section comprises a plurality of instructions and has an associated section identifier;
   accessing, by a load address predictor (LAP), a LAP table entry for the section of the instruction cache using the section identifier, wherein the LAP table entry includes a first value for the number of times the section has been seen at instruction fetch, a second value for the number of iterations of the section before moving to the next line in a data cache, and a third value indicating a confidence level of the recommendation;
   predicting, by the LAP and using the LAP table entry, a set of data addresses that will be loaded; and
   sending, to a load-store unit (LSU), a recommendation to prefetch the set of data addresses.

13. The computer program product of claim 12, wherein the recommendation sent to the LSU includes a confidence score that indicates a probability that the set of data addresses will be loaded during execution of a program that includes the first instruction, and wherein the LSU is configured to prefetch the set of data addresses in response to the confidence score exceeding a predetermined threshold.

14. The computer program product of claim 12, wherein the method further comprises:
   updating, by the LAP and at completion, the LAP table entry, wherein updating the LAP table entry includes coalescing, by the LAP, multiple loads of an unrolled loop to the same line into a single entry.

15. The method of claim 1, the method further comprising:
   determining, by the LAP, that a prefetch trigger is met, wherein the predicting the set of data addresses that will be loaded is performed in response to determining that the prefetch trigger is met.

16. The method of claim 1, wherein the section of the instruction cache comprises a plurality of cache lines.

17. The method of claim 1, the method further comprising:
   determining, using an instruction address of the first instruction, the section of the instruction cache that includes the first instruction.

18. The method of claim 17, wherein accessing the LAP table entry for the section of the instruction cache comprises:
   determining a section address for the section that includes the first instruction; and
   accessing the LAP table entry for the section in the LAP using the section address.

* * * * *